US007701393B2

(12) United States Patent
Bornholdt

(10) Patent No.: US 7,701,393 B2
(45) Date of Patent: Apr. 20, 2010

(54) RADIO FREQUENCY NAVIGATION USING FREQUENCY RESPONSE MATCHING

(75) Inventor: James M. Bornholdt, Wildwood, MO (US)

(73) Assignee: The Boeing Company, Irvine, CA (US)

( * ) Notice: Subject to any disclaimer, the term of this patent is extended or adjusted under 35 U.S.C. 154(b) by 210 days.

(21) Appl. No.: 11/612,663

(22) Filed: Dec. 19, 2006

(65) Prior Publication Data

US 2008/0143605 A1 Jun. 19, 2008

(51) Int. Cl.
*G01S 3/02* (2006.01)
(52) U.S. Cl. ..................................... 342/451
(58) Field of Classification Search .......... 342/450–457
See application file for complete search history.

(56) References Cited

U.S. PATENT DOCUMENTS

| | | | | |
|---|---|---|---|---|
| 5,574,466 | A | * | 11/1996 | Reed et al. .................. 342/359 |
| 6,108,557 | A | * | 8/2000 | Wax et al. ................ 455/456.2 |
| 6,167,274 | A | * | 12/2000 | Smith ...................... 455/456.3 |
| 6,873,852 | B2 | * | 3/2005 | Koorapaty et al. .......... 455/458 |
| 2005/0037776 | A1 | | 2/2005 | Perez-Breva et al. |
| 2006/0125692 | A1 | | 6/2006 | Wang et al. |
| 2006/0276140 | A1 | * | 12/2006 | Austin et al. ............. 455/67.11 |
| 2007/0150114 | A1 | * | 6/2007 | Gardner et al. .............. 700/286 |
| 2007/0241963 | A1 | * | 10/2007 | Krumm et al. .............. 342/451 |

OTHER PUBLICATIONS

The Boeing Company, International Search Report, corresponding to International Patent Application No. PCT/US2007/087659 dated Mar. 27, 2008.
The Boeing Company, Written Opinion, corresponding to International Patent Application No. PCT/US2007/087659 dated Mar. 27, 2008.
Ali, A.A. et al.: "High resolution WLAN indoor channel parameter estimation and measurements for communication and positioning applications at 2.4, 5.2 and 5.8 GHz." Radio and Wireless Symposium, 2006 IEEE San Diego, CA, USA 2006, Piscataway, NJ, USA, IEEE, Jun. 20, 2006, pp. 279-282.
Hashemi, H. et al.: "Indoor propagation measurements at infrared frequencies for wireless local area networks applications." IEEE Transactions on Vehicular Technology, IEEE Service Center, Piscataway, NJ, US, vol. 43, No. 3, part 1, Aug. 1, 1994, pp. 562-576.

* cited by examiner

*Primary Examiner*—Thomas H Tarcza
*Assistant Examiner*—Nga X Nguyen
(74) *Attorney, Agent, or Firm*—Charles L. Moore; Moore & Van Allen, PLLC

(57) ABSTRACT

A method for radio navigation may include predicting a frequency response for each of a multiplicity of possible device locations. The method may also include measuring a frequency response at an actual device location. The method may further include matching the measured frequency response to one of the predicted frequency responses to determine an estimated device location, wherein the estimated device location corresponds to the possible device location associated with the one predicted frequency response that most closely matches the measured frequency response.

33 Claims, 7 Drawing Sheets

RADIO FREQUENCY NAVIGATION USING FREQUENCY RESPONSE MATCHING

BACKGROUND OF THE INVENTION

The present invention relates to navigation and determining a location of a device, such as a communications device or the like and more particularly to radio frequency navigation or determining a location of a device using frequency response matching.

Determining a location of a device using radio navigation may be particularly challenging within a structure or other operating environment where the device is proximate to near field scattering objects that can cause time of arrival techniques and other techniques to be unreliable. When a radio navigation receiver or the like is in the near field of one or more scattering objects, insufficient time may elapse between a line of sight (LOS) signal and non-line of sight (NLOS) signals, scattered by the scattering objects, to distinguish between these types of signals. This may result in accuracy errors on the order of the distance between the receiver and the scattering objects. When much higher positioning accuracy is needed, time of arrival techniques may be unreliable, especially when the signal bandwidth is limited.

BRIEF SUMMARY OF THE INVENTION

In accordance with an embodiment of the present invention, a method for radio navigation may include predicting a frequency response for each of a multiplicity of possible device locations. The method may also include measuring a frequency response at an actual device location. The method may further include matching the measured frequency response to one of the predicted frequency responses to determine an estimated device location, wherein the estimated device location corresponds to the possible device location associated with the one predicted frequency response that most closely matches the measured frequency response.

In accordance with another embodiment of the present invention, a method for radio navigation may include predicting a frequency response for each of a multiplicity of possible device locations and measuring a frequency response at an actual device location. The method may also include comparing the measured frequency response to each of the predicted frequency responses respectively associated with each of the multiplicity of possible device locations. The method may further include selecting an estimated device location from the multiplicity of possible device locations based on a best fit between the measured frequency response and one of the predicted frequency responses.

In accordance with another embodiment of the present invention, a device for radio navigation may include a frequency response prediction subsystem to predict a frequency response for each of a multiplicity of possible device locations. The device may also include a frequency response measurement subsystem to measure a frequency response at an actual device location. The device may further include a location estimation subsystem to compare the measured frequency response to each of the predicted frequency responses respectively associated with each of the multiplicity of possible device locations, and to select an estimated device location from the multiplicity of possible device locations based on a best fit between the measured frequency response and one of the predicted frequency responses.

In accordance with another embodiment of the present invention, a device for radio navigation may include means for predicting a frequency response for each of a multiplicity of possible device locations and means for measuring a frequency response at an actual device location. The device may also include means for matching the measured frequency response to one of the predicted frequency responses to determine an estimated device location, wherein the estimated device location corresponds to the possible device location associated with the one predicted frequency response that most closely matches the measured frequency response.

In accordance with another embodiment of the present invention, a computer program product for radio navigation may include a computer usable medium having computer usable program code embodied therein. The computer usable medium may include computer usable program code configured to compare a measured frequency response to each of a multiplicity of predicted frequency responses respectively associated with each of a multiplicity of possible device locations. The computer usable medium may also include computer usable program code configured to select an estimated device location from the multiplicity of possible device locations based on a best fit between the measured frequency response and one of the predicted frequency responses.

In accordance with another embodiment of the present invention, a vehicle may include a device for radio navigation. The device for radio navigation may include means for predicting a frequency response for each of a multiplicity of possible vehicle locations and means for measuring a frequency response at an actual vehicle location. The vehicle may also include means for matching the measured frequency response to one of the predicted frequency responses to determine an estimated vehicle location, wherein the estimated vehicle location corresponds to the possible vehicle location associated with the one predicted frequency response that most closely matches the measured frequency response.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

Figure 1:
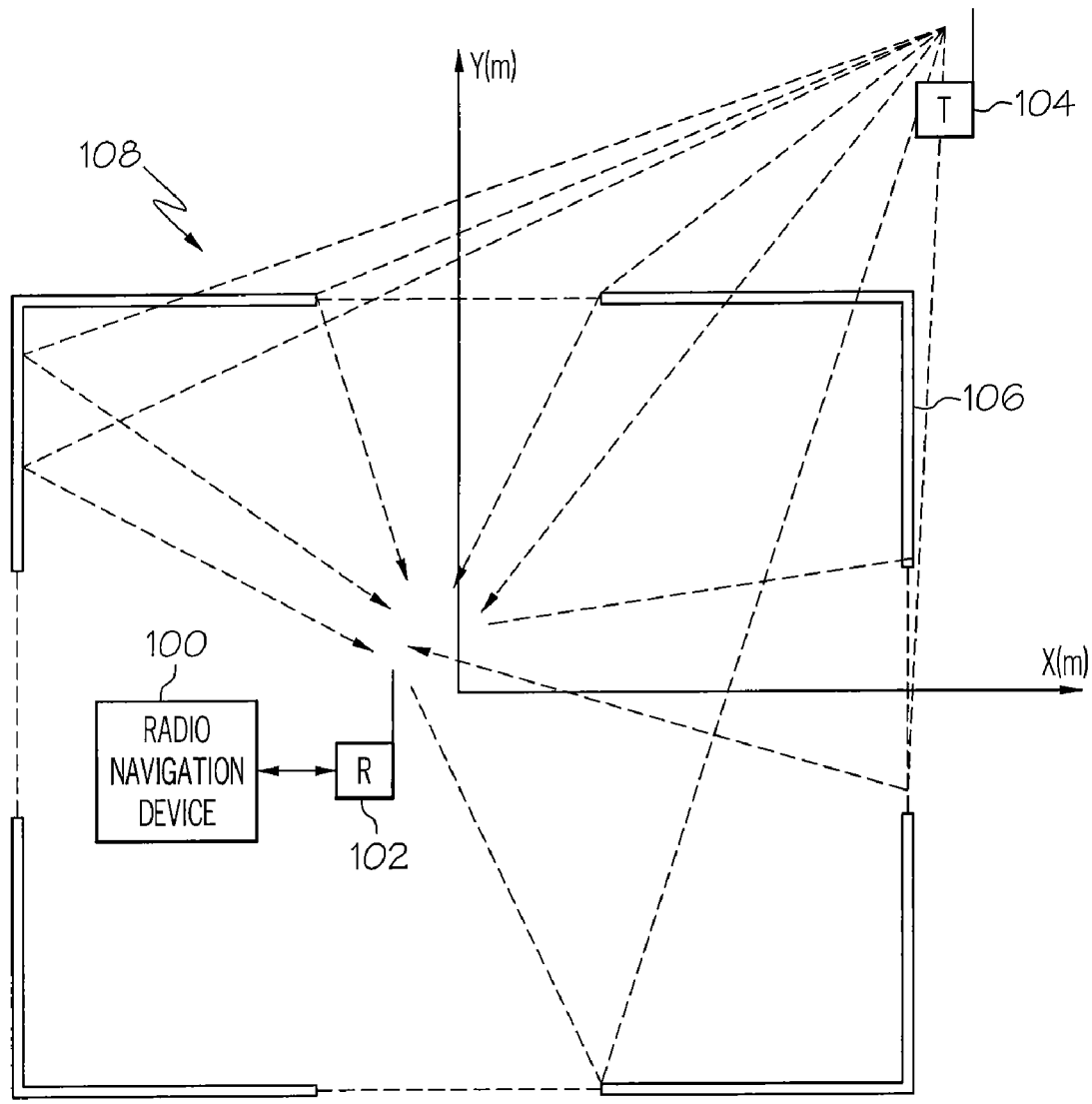
FIG. 1 is an illustration of a radio navigation device adapted to use frequency response matching to determine a location of a device in accordance with an embodiment of a present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is an illustration of a radio navigation device 100 adapted to use frequency response matching to determine a location of a device 102 in accordance with an embodiment of a present invention. The device 102 may be a communications device, receiver or any type of device for which a location may be desired for navigational purposes, tracking purposes, or other purposes. The device 102 may be a vehicle for which the location is desired. The vehicle may be a terrestrial vehicle, aerospace vehicle, watercraft or the like. The navigation device 100 may also be incorporated in the device 102 or may be a separate device as illustrated in the embodiment of FIG. 1. An example of a radio navigation device 300 that may be used for the device 100 for determining location or estimating location using radio navigation or similar techniques will be described in more detail with reference to FIG. 3.

The device 102 and/or radio navigation device 100 may receive signals from another communications device or transmitter 104. The device 104 may also be vehicle, such as an aerospace vehicle, terrestrial vehicle, watercraft or the like, associated with the communications device or transmitter. The signals may be scattered by various scattering objects 108, such as windows, doors or other features of a structure 106 as illustrated in FIG. 1. Additionally, the radio navigation device 100 may take into account the electromagnetic properties of these features or scattering objects 108. Accordingly, the device 102 and navigation device 100 may be receiving multiple scattered signals in addition to a main signal from transmitter 104.

As described herein, the radio navigation device 100 may be adapted to predict a frequency response for each of a multiplicity of possible locations of device 102 and to measure a frequency response at the actual location of the device 102. The radio navigation device 100 may then match the measured frequency response to one of the predicted frequency responses to determine an estimated location of the device 102. The estimated device location may correspond to the possible device location associated with the one predicted frequency response that most closely matches the measured frequency response. In predicting the frequency response at multiple possible device locations, the radio navigation device 100 may take into account any scattering objects or multipath interference caused by any scattering objects 108, such as features of the structure 106, windows, doors, or the like, and electromagnetic properties of these features or scattering objects 108.

Figure 2:
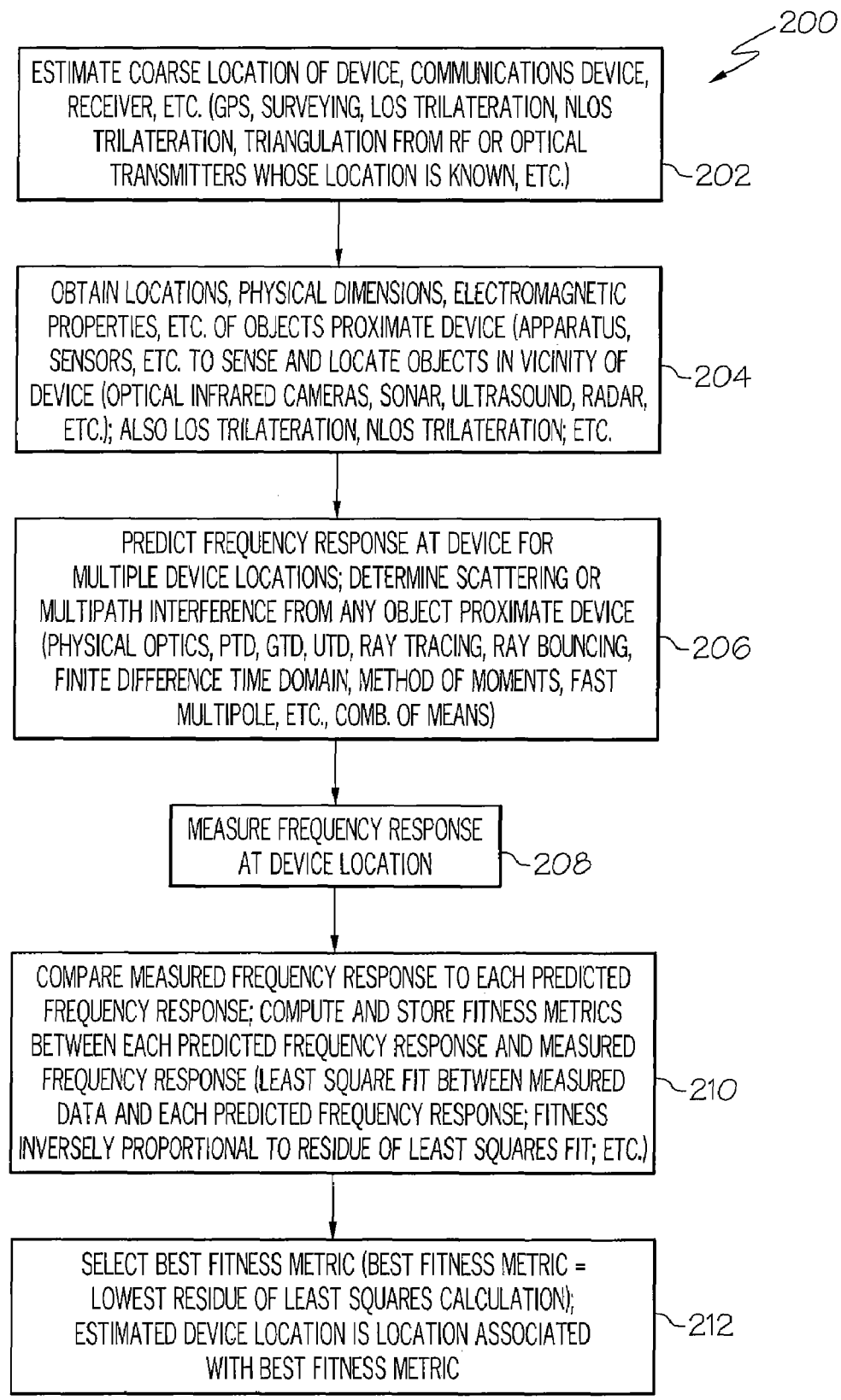
FIG. 2 is a flow chart of an example of a method for radio frequency navigation using frequency response matching in accordance with an embodiment of the present invention.

FIG. 2 is a flow chart of an example of a method 200 for radio frequency navigation using frequency response matching in accordance with an embodiment of the present invention. The method 200 may be embodied in the radio navigation device 100. In block 202, a coarse location of a device to be located may be estimated. The device may be a communications device, a receiver or any kind of device for which a geographic location may be desired The device may be located within a structure including multiple scattering objects or other environment that may include multiple scattering objects. The scattering objects may be in a near field from an electromagnetic perspective or within a predetermined number of wavelengths from the device or antenna associated with the communications device or receiver.

The coarse location may be estimated by using a global positioning system, line of sight (LOS) trilateration, non-line of sight (NLOS) trilateration, trilateration using radio frequency or optical transmitters whose locations are known or other location estimation techniques. An example of a method and system for estimating a location of a device, such as a communications device or similar device, is described in U.S. patent application Ser. No. 11/612,674, entitled "Method and System for Determining a Location of a Communications Device", by James M. Bornholdt, which is incorporated herein by reference, and which is assigned to the same assignee as the present invention.

In block 204, geographic locations, physical dimensions, electromagnetic properties or other properties of any objects proximate the device being located may be obtained. The objects proximate to the device may include but are not necessarily limited to features of a structure, human beings, other devices or communications devices or any type of object that may scatter electromagnetic energy or cause multipath signals or interference to be received at the device being geographically located.

The locations, physical dimensions, electromagnetic properties, and the like may be determined or obtained in block 204 by using apparatus or sensors to sense or locate the objects, such as optical cameras, infrared cameras, sonar, ultrasound, radar or the like. The method and system described in U.S. patent application Ser. No. 11/612,674 is an additional example of what may be used to locate any objects in the vicinity of the device to be located or for which a location is to be estimated.

In block 206, a frequency response at the device being located may be predicted for multiple device locations which may be possible actual locations of the device. In predicting the frequency responses, scattering or multipath interference from any objects proximate to the device may be determined or taken into consideration. The scattering or multipath interference may be determined or predicted using methods such as physical optics, physical theory of diffraction (PTD), geometric theory of diffraction (GTD), uniform theory of diffraction (UTD), ray tracing, ray bouncing, finite difference time domain techniques, method of moments, fast multipole, or similar techniques or a combination of two or more of these techniques.

Figure 4:
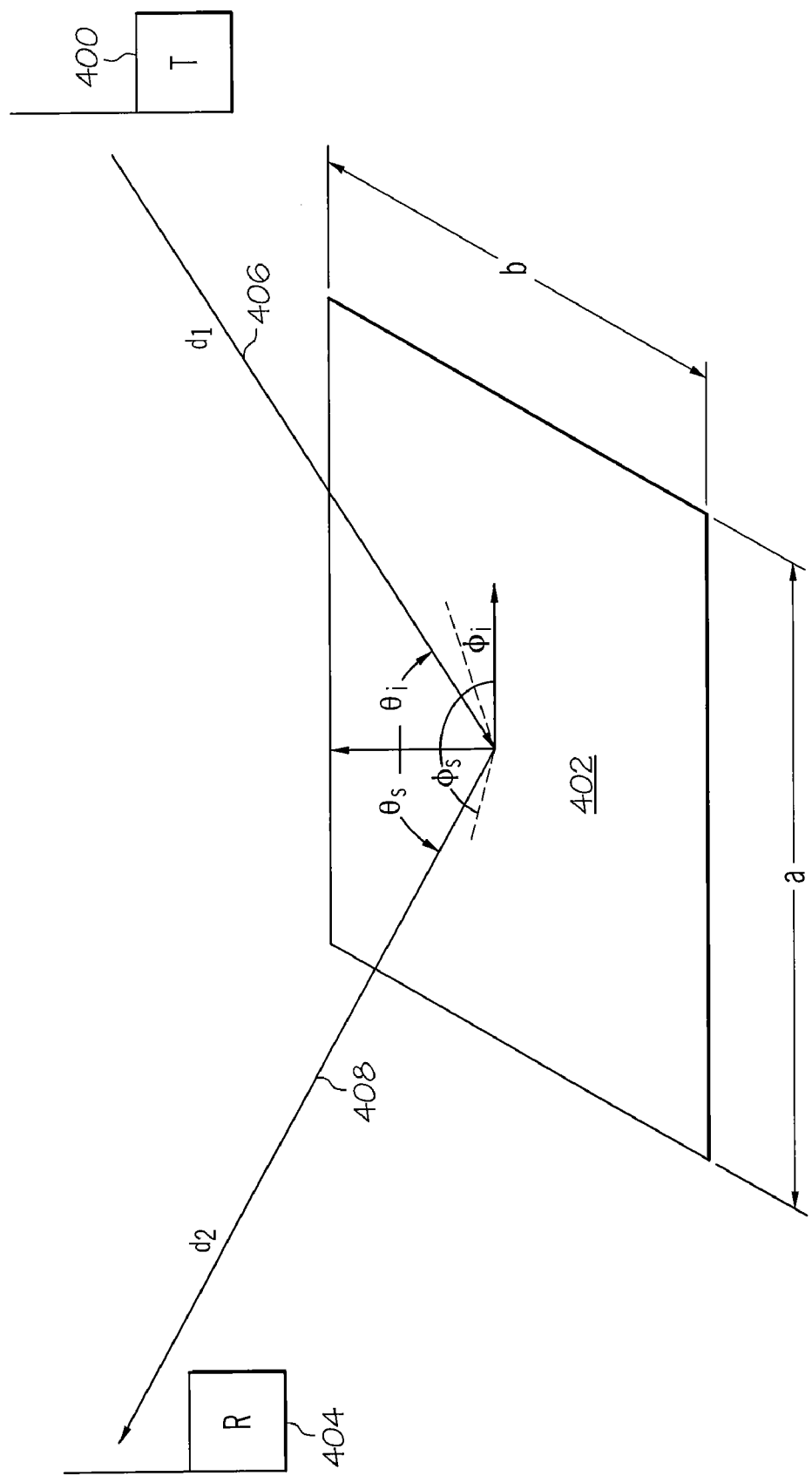
FIG. 4 illustrates an example of predicting scattering interference of an object in accordance with an embodiment of the present invention.
Figure 5A:
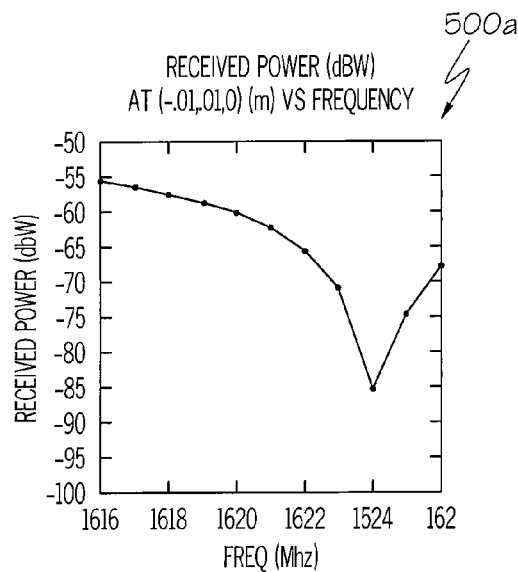
FIGS. 5A-5I illustrates examples of predicted frequency responses at multiple possible locations proximate to a device being located in accordance with an embodiment of the present invention.
Figure 5B:
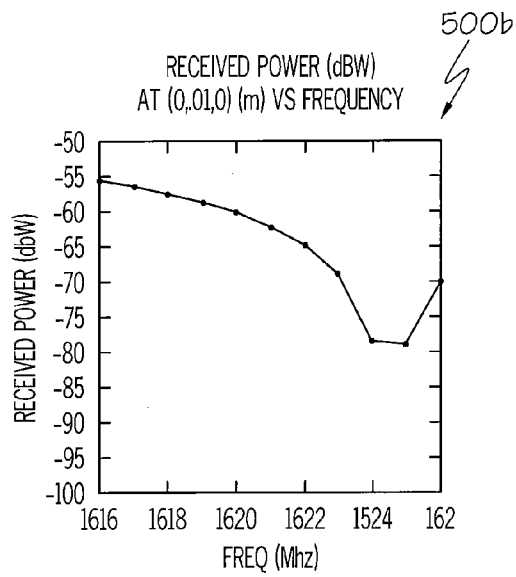
Figure 5C:
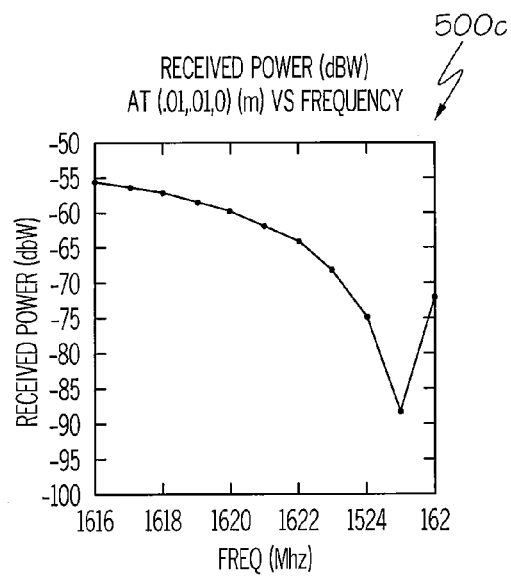
Figure 5D:
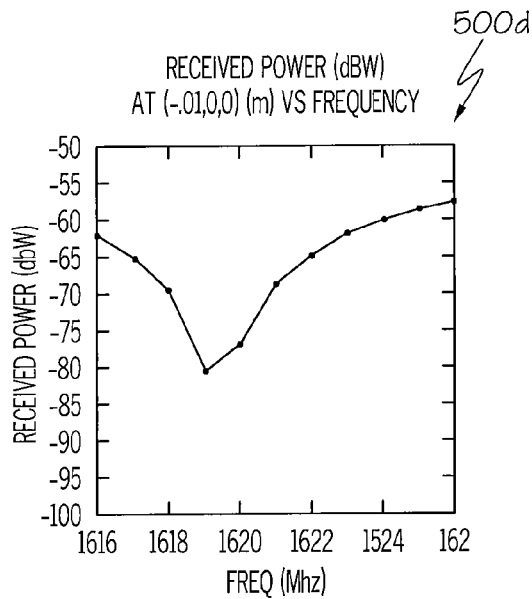
Figure 5E:
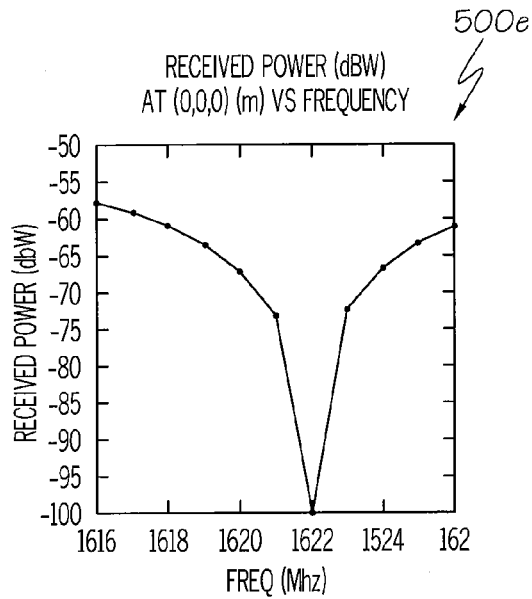
Figure 5F:
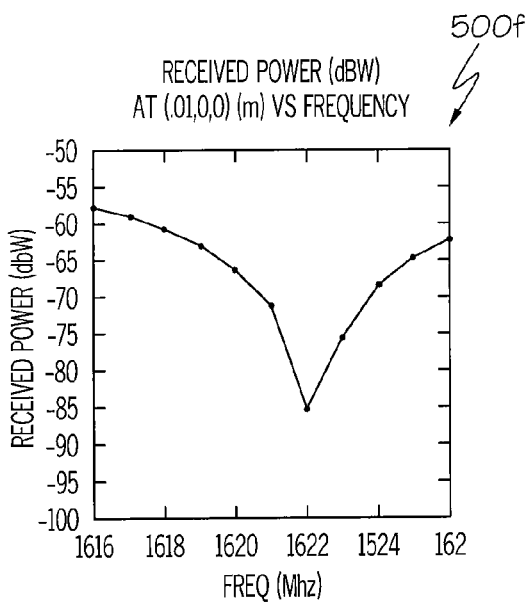
Figure 5G:
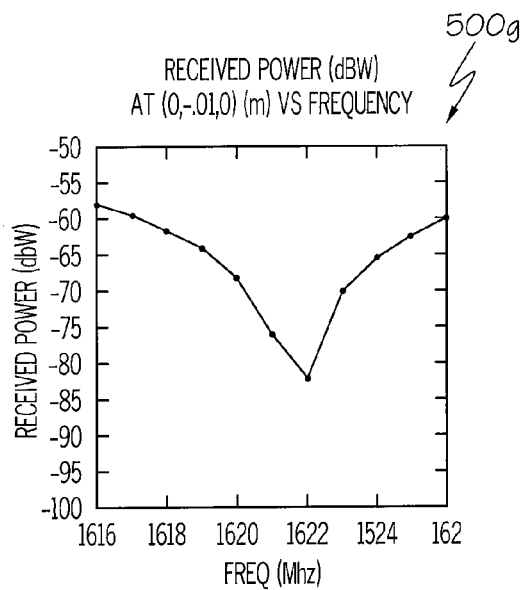
Figure 5H:
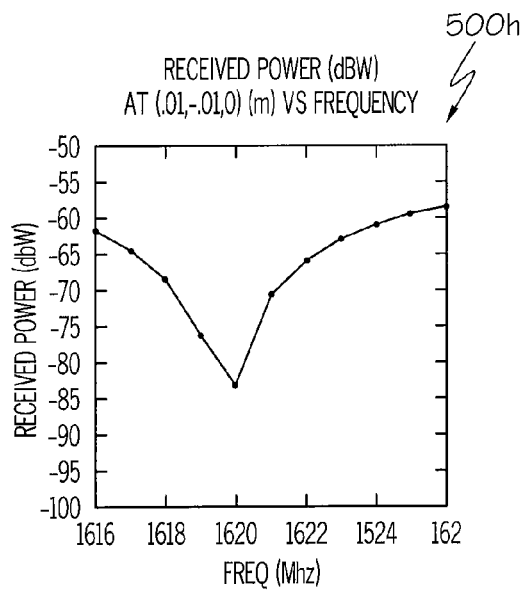
Figure 5I:
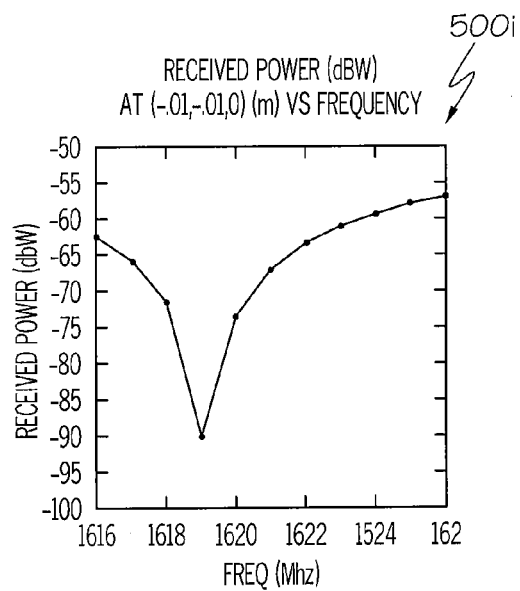

The scattering or multipath interference may be determined or predicted by predicting an expected receive power. An example of predicting the received power using physical optics or similar techniques will be described with reference to FIG. 4. In FIG. 4, a signal or wave transmitted by a transmitter 400 may be scattered by a scattering object 402 and received by a receiver 404. In this example, the scattering object 402 may be a flat conducting plate for purposes of explanation. An incident wave represented by arrow 406 in FIG. 4 may be incident upon the scattering object 402 at an elevation angle of $\theta_i$ and an azimuth angle of $\phi_i$ as illustrated in the example of FIG. 4. A scattered wave represented by arrow 408 in FIG. 4 may be reflected by the scattering device 402. The predicted receive power may be determined by equation 1:

$$P_r = P_t * G_t * G_r * \sigma * (\lambda/4\pi)^2 / (4\pi * d_1 * d_2)^2 \quad \text{(Eq. 1)}$$

Where
  $P_r$=received power (Watts)
  $P_t$=transmitter power (Watts)
  $G_t$=gain of the transmit antenna in direction of scattering object
  $d_1$=distance between transmitter and scattering object (meters)
  $G_r$=gain of the receive antenna in direction of scattering object
  $d_2$=distance between scattering object and receiver (meters)
  $\lambda$=wavelength of radio wave (meters)
  $\sigma$=bistatic radar cross section of scattering object Physical optics bistatic radar cross section ($\sigma$) of a flat rectangular metal plate as in the example of FIG. 4 may be determined by equation 2:

$$\sigma = 4\pi * [a*b/\lambda * \cos(\theta_s) * \sin(X)/X * \sin(Y)/Y]^2 \quad \text{(Eq. 2)}$$

Where
  $X = \pi/\lambda * a[\sin(\theta_i)*\cos(\phi_i) + \sin(\theta_s)*\cos(\phi_s)]$
  $Y = \pi/\lambda * b[\sin(\theta_i)*\sin(\phi_i) + \sin(\theta_s)*\sin(\theta_s)]$
  $\lambda$=wavelength of radio wave (meters)
  a=length of plate
  b=width of plate
  $\theta_i$=elevation angle of incident wave
  $\phi_i$=azimuthal angle of incident wave
  $\theta_s$=elevation angle of scattered wave
  $\phi_s$=azimuthal angle of scattered wave FIGS. 5A-5I illustrates examples of predicted frequency responses 500a-500i at multiple possible locations of a device to be located in accordance with an embodiment of the present invention. These responses 500 may be stored for comparing and matching to the measured frequency response at the actual location of the device being located as described herein.

In block 208, an actual frequency response at the device location may be measured. The frequency response may be measured using a dynamically tunable receiver or any type of device capable of measuring the frequency response of a signal or signals transmitted by a transmitter, such as transmitter 104 in FIG. 1. The device or apparatus for measuring the actual frequency response may be part of the radio navigation device 100.

In block 210, the actual measured frequency response from block 208 may be compared to each predicted frequency response from block 206 corresponding to different possible device locations. The measured frequency response may be matched to one of the predicted frequency responses that most closely fits or corresponds to the measured frequency response. The estimated device location may correspond to the possible device locations associated with the one predicted frequency response that most closely matches the measured response.

An example of matching the measured frequency response to one of the predicted frequency responses may include computing and storing fitness metrics between each predicted frequency response and the measured frequency response. A least square fit may be calculated between the measured frequency response or responses and each predicted frequency response. The fitness may be inversely proportional to a residue of the least square fit. Other methods to determine a fit or fitness metric between the measured frequency response and the predicted frequency response for multiple different possible device locations may also be used.

In block 212, a best fitness metric may be selected. The best fitness metric may be the lowest residue of the least squares calculation in this embodiment of the present invention which uses the least square analysis to calculate a fitness metric for matching the measured frequency response and predicted frequency responses. The device location may be substantially the location associated with the best fitness metric.

Figure 3:
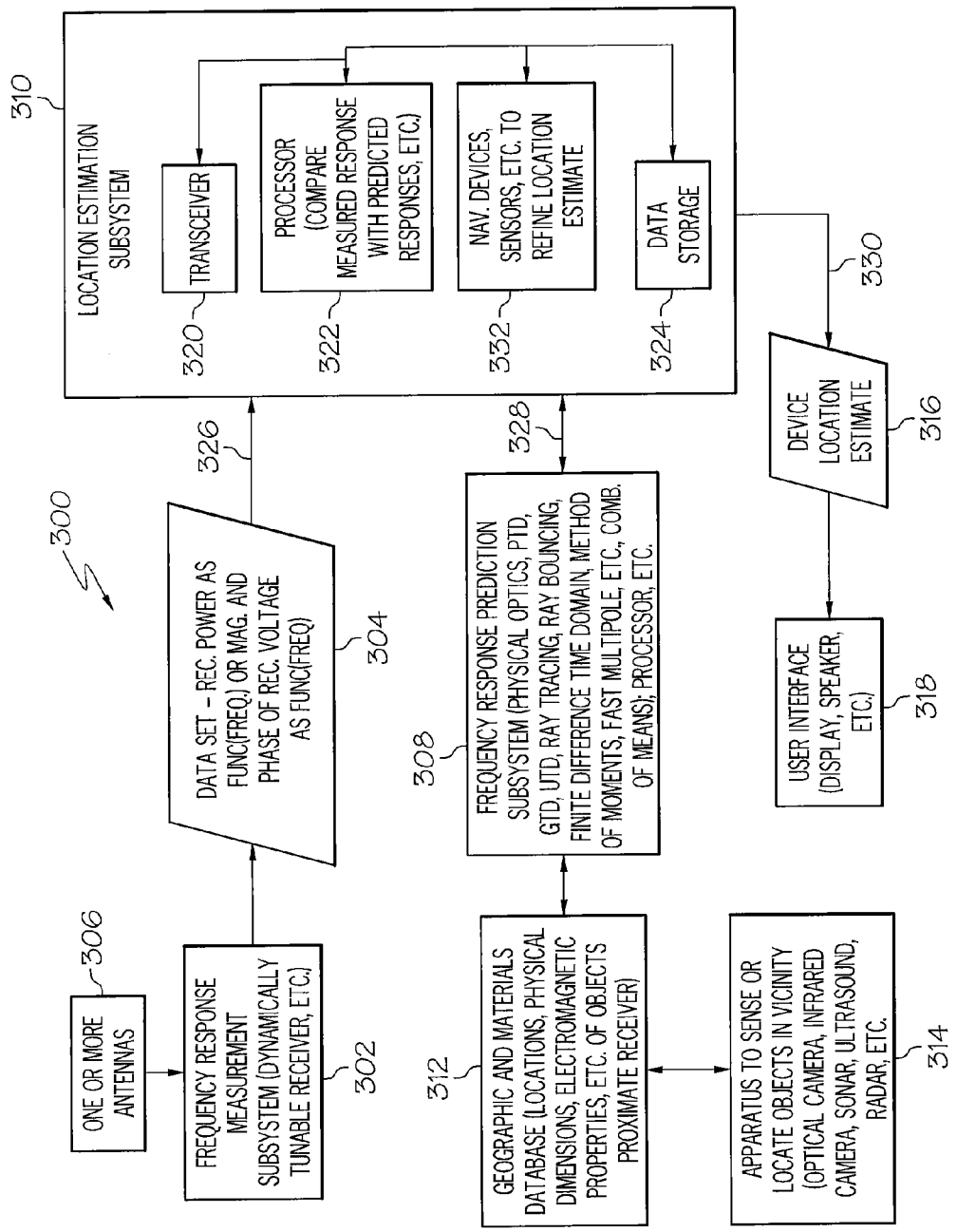
FIG. 3 is a block diagram of an exemplary device for radio frequency navigation using frequency response matching in accordance with an embodiment of the present invention.

FIG. 3 is a block diagram of an exemplary device or system 300 for radio frequency navigation using frequency response matching in accordance with an embodiment of the present invention. The device or system 300 may be embodied in the device 100 of FIG. 1 which may also be incorporated in the device 102. The method 200 may be embodied in the device 300. Different blocks or modules of the method 200 may be embodied in different elements or subsystems or combinations of elements or subsystems of the device 300. The device 300 may also be a vehicle or form part of a vehicle, such as an aerospace vehicle, terrestrial vehicle, watercraft or the like.

The device 300 may include a frequency response measurement subsystem 302. The frequency response measurement subsystem 302 may measure the frequency response of the signal at the actual location of the device 300 or device to be located. In one embodiment of the present invention, the frequency response measurement subsystem 302 may include a dynamically tunable receiver or similar apparatus to measure the frequency response. The dynamically tunable receiver may measure the power at a set of sample frequencies across a specified band.

In another embodiment of the present invention, the frequency response measurement subsystem 302 may include a wideband receiver or similar apparatus. The wideband receiver may measure a time response of the signal and may compute the frequency response by taking a Fourier transform on the time response.

The output 304 of the frequency response measurement subsystem 302 may be a data set containing either the received power as a function of frequency or the magnitude and phase of the received voltage as functions of frequency.

One or more antennas 306 may feed into the device 300 or frequency response measurement subsystem 302. In another embodiment of the present invention, the system 300 may use antennas that are sensitive to polarization and angle-of-arrival. The output data 304 of the frequency response measurement subsystem 302 may then include received power (or voltage magnitude and phase) as a function of antenna polarization and direction as well as frequency in this embodiment of the invention.

The system or device 300 may also include a frequency response prediction subsystem 308. The frequency response prediction subsystem 308 may predict the frequency response of a signal receivable at multiple possible locations in a local area or vicinity around the device 300, or device being located that is associated with the device or system 300. The prediction of the frequency response may be calculated using physical optics, physical theory of diffraction (PTD), geometric theory of diffraction (GTD), uniform theory of diffraction (UTD), ray tracing, ray bouncing, finite difference time domain, method of moments, fast multipole, or a hybrid combination of any of these techniques or other computational electromagnetic techniques.

The approximate location of the device 300 may be supplied by a Location Estimate Subsystem 310. The location predictions may use a physical description of any objects or scattering objects in a local environment of the device 300. The objects may include buildings, walls, windows, floors, roofs, furniture, occupants or other objects. The occupants may include both the individual operating the device 300 (unless the device includes or is mounted to a robotic) and any other individuals in the local environment. The location predictions may also account for any impact of the antenna or antennas 306, device 300 or impact of other devices in the environment on the received signal.

The locations, physical dimensions and electromagnetic materials of these objects may be supplied by a geographic and materials database subsystem 312. The frequency response subsystem 308 may also include a computation device and communication interfaces to the location estimation subsystem 310 and the geographic and materials database 312.

The geographic and materials database subsystem 312 may include maps of the operating environment, blueprints for buildings and other structures, electromagnetic material descriptions of objects in the environment and any other data that may be helpful in predicting frequency responses by the frequency response prediction subsystem 308. The geographic and materials database subsystem 312 may also include or may be associated with apparatus 314 to sense or detect objects in the vicinity of the device or system 300 which may impact the frequency response of any signal receivable by the device 300. Given an approximate or coarse location for the device 300 as determinable in block 202 of the method 200 in FIG. 2, the geographic and materials database subsystem 312 may supply the frequency response prediction subsystem 308 with a physical description of all known objects in the vicinity of the device 300. The physical description of each object may include the object's location, attitude, physical dimensions and constitutive electromagnetic properties of materials contained in the object. The frequency response prediction subsystem 308 may use this data to predict frequency responses in the vicinity of the device 300.

The geographic and materials database subsystem 312 may also include computational and memory devices and communication interfaces to other subsystems. The geographic and materials database subsystem 312 may further include or may be associated with acoustic, radio-frequency, infra-red, ultra-violet and optical transceivers or sensors 314 or other apparatus capable of sensing and locating physical objects in the vicinity of the device 300. Such apparatus may include optical and infrared cameras, sonar, ultrasound, and radar. The subsystem 312 or device 300 may also include a radio transceiver for communicating data with other devices inside and outside the local operating environment of the device 300.

The location estimation subsystem 310 may estimate the location of the device 300 by comparing the measured response 304 from the frequency response measurement subsystem 302 with each of the predicted responses from the frequency response prediction subsystem 308, and may select a best match. The estimate for the location of the device 300 may be chosen as the location corresponding to the predicted frequency response which best matches the measured frequency response. As previously discussed, in one embodiment of the present invention, the best match may be determined by calculating a fitness metric between each frequency response corresponding to a possible or predicted device location and the measured frequency response at the actual device location. The baseline fitness metric may be computed as the least square fit between the measured frequency response and each predicted frequency response. The fitness is inversely proportional to the residue of the least squares fit.

Predicted and measured responses that match well will have a low residue and high fitness.

The location estimation subsystem 310 may output the device location estimate 316 to a user by means of a user interface 318 which may be a graphical interface presentable on a display or other interface to convey device location by vision or sound. The interface 318 may be incorporated as part of the location estimation subsystem 310 or may be a separate component.

The location estimation subsystem 310 may also include a transceiver 320 to convey device location by radio communications to external devices inside and outside the local operating environment of the device 300 to enable tracking of the device 300. The location estimation subsystem 310 may also provide approximate locations for the device 300 to the frequency response prediction subsystem 308.

The location estimation subsystem 310 may further include a computational device or processor 322 to compare the measured frequency response with the predicted responses and to perform other functions. A memory device 324 or devices may be included to store data, and communication interfaces 326, 328 and 330 to other subsystems may be provided. The location estimation subsystem 310 may also include navigation devices 332, such as inertial navigation devices or the like, or other sensors to refine the location estimate.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for radio navigation, comprising:
   predicting a frequency response for each of a multiplicity of possible device locations, wherein predicting the frequency response comprises:
      determining a location of any objects proximate to the device;
      determining physical dimensions of any objects proximate to the device; and
      determining electromagnetic properties of any objects proximate to the device;
   measuring a frequency response at an actual device location; and
   matching the measured frequency response to one of the predicted frequency responses to determine an estimated device location, wherein the estimated device location corresponds to the possible device location associated with the one predicted frequency response that most closely matches the measured frequency response, wherein each predicted frequency response for each of the multiplicity of possible device locations and the measured frequency response at the actual device location are representable by a plot of received power over a selected range of frequencies to match the measured frequency response to one of the predicted frequency responses.

2. The method of claim 1, wherein matching the measured frequency response to one of the predicted frequency responses comprises:
   comparing the measured frequency response to each of the predicted frequency responses respectively associated with each of the multiplicity of possible device locations; and
   selecting the estimated device location from the multiplicity of possible device locations based on a best fit between the measured frequency response and one of the predicted frequency responses.

3. The method of claim 1, further comprising determining a fitness metric between each predicted frequency response and the measured frequency response.

4. The method of claim 1, further comprising determining a least square fit between the measured frequency response and each predicted frequency response.

5. The method of claim 4, further comprising determining a fitness metric as being inversely proportional to a residue of the least square fit for the measured frequency response and each predicted frequency response.

6. The method of claim 5, further comprising selecting a best fit metric corresponding to a lowest residue of the least square fit determination between the measured frequency response and each predicted frequency response, wherein the estimated device location corresponds to the possible device location with the best fit metric.

7. The method of claim 1, further comprising estimating a coarse location of the device.

8. The method of claim 7, wherein estimating the coarse location of the device comprises at least one of determining a global position system location; surveying; line of sight trilateration; non-line of sight trilateration, triangulation from a radio frequency or optical transmitter whose location is known; and a combination of any of these.

9. The method of claim 1, further comprising determining scattering from any objects proximate to the device in predicting the frequency response.

10. The method of claim 1, further comprising determining multipath interference caused by any objects proximate to the device in predicting the frequency response.

11. The method of claim 1, wherein determining multipath interference by any objects proximate to the device comprises at least one of:
  using physical optics;
  using physical theory of diffraction;
  using geometric theory of diffraction;
  using uniform theory of diffraction;
  using ray tracing;
  using ray bouncing;
  using finite difference time domain techniques;
  using method of moments;
  using fast multipole techniques; and
  using a combination of these.

12. A method for radio navigation, comprising:
  predicting a frequency response for each of a multiplicity of possible device locations, wherein predicting the frequency response comprises:
    determining a location of any objects proximate to the device;
    determining physical dimensions of any objects proximate to the device; and
    determining electromagnetic properties of any objects proximate to the device;
  measuring a frequency response at an actual device location;
  comparing the measured frequency response to each of the predicted frequency responses respectively associated with each of the multiplicity of possible device locations; and
  selecting an estimated device location from the multiplicity of possible device locations based on a best fit between the measured frequency response and one of the predicted frequency responses, wherein each predicted frequency response for each of the multiplicity of possible device locations and the measured frequency response at the actual device location are each representable by a plot of received power over a selected range of frequencies to determine the best fit between the measured frequency response and one of the predicted frequency responses.

13. The method of claim 12, further comprising determining a fitness metric between each predicted frequency response and the measured frequency response.

14. The method of claim 13, wherein determining the fitness metric comprises determining a residue of a least square fit for the measured frequency response and each predicted frequency response, wherein the fitness metric is inversely proportional to the residue of the least square fit.

15. The method of claim 14, further comprising selecting a best fit metric corresponding to a lowest residue of the least square fit determination between the measured frequency response and each predicted frequency response, wherein the estimated device location corresponds to the possible device location with the best fit metric.

16. The method of claim 12, further comprising determining multipath interference caused by any objects proximate to the device in predicting the frequency response.

17. A device for radio navigation, comprising:
  a frequency response prediction subsystem to predict a frequency response for each of a multiplicity of possible device locations;
  a frequency response measurement subsystem to measure a frequency response at an actual device location;
  a location estimation subsystem to compare the measured frequency response to each of the predicted frequency responses respectively associated with each of the multiplicity of possible device locations, and to select an estimated device location from the multiplicity of possible device locations based on a best fit between the measured frequency response and one of the predicted frequency responses, wherein each predicted frequency response for each of the multiplicity of possible device locations and the measured frequency response at the actual device location are each representable by a plot of received power over a selected range of frequencies to determine the best fit between the measured frequency response and one of the predicted frequency responses; and
  a geographic and materials database to store locations, physical dimensions and electromagnetic properties of any objects proximate to the device; and
  an apparatus to sense or locate any objects proximate to the device.

18. The device of claim 17, further comprising a user interface to present a device location estimate.

19. The device of claim 17, further comprising a transceiver to transmit a device location to a remote communications device.

20. The device of claim 17, wherein the frequency response measurement system comprises a dynamically tunable receiver.

21. The device of claim 17, wherein the frequency response subsystem comprises a module to determine multipath interference caused by any objects proximate to the device.

22. The device of claim 17, further comprising location determination devices associated with the location estimation subsystem to refine a location estimate.

23. A device for radio navigation, comprising:
  means for predicting a frequency response for each of a multiplicity of possible device locations, wherein the means for predicting a frequency response comprises:
    means for determining a location of any objects proximate to the device;
    means for determining physical dimensions of any objects proximate to the device; and
    means for determining electromagnetic properties of any objects proximate to the device;
  means for measuring a frequency response at an actual device location; and
  means for matching the measured frequency response to one of the predicted frequency responses to determine an estimated device location, wherein the estimated device location corresponds to the possible device location associated with the one predicted frequency response that most closely matches the measured frequency response, wherein each predicted frequency response for each of the multiplicity of possible device locations and the measured frequency response at the actual device location are representable by a plot of received power over a selected range of frequencies to match the measured frequency response to one of the predicted frequency responses.

24. The device of claim 23, further comprising means for determining scattering or multipath interference caused by any objects proximate to the device.

25. The device of claim 23, further comprising means for determining a fitness metric between each predicted frequency response and the measured frequency response.

26. The device of claim 23, further comprising means for determining a coarse location of the device.

27. A computer program product for radio navigation, the computer program product comprising:

a computer usable storage medium having computer usable program code embodied therein, the computer usable storage medium comprising:
  computer usable program code configured to predict a frequency response for each of a multiplicity of possible device locations, wherein the computer usable program code to predict the frequency response comprises:
    computer usable program code configured to determine a location of any objects proximate to the device;
    computer usable program code configured to determine physical dimensions of any objects proximate to the device; and
    computer usable program code configured to determine electromagnetic properties of any objects proximate to the device;
  computer usable program code configured to compare a measured frequency response to each of the multiplicity of predicted frequency responses respectively associated with each of a multiplicity of possible device locations; and
  computer usable program code configured to select an estimated device location from the multiplicity of possible device locations based on a best fit between the measured frequency response and one of the predicted frequency responses, wherein each predicted frequency response for each of the multiplicity of possible device locations and the measured frequency response at the actual device location are each representable by a plot of received power over a selected range of frequencies to determine the best fit between the measured frequency response and one of the predicted frequency responses.

28. The computer program product of claim 27, further comprising computer usable program code configured to determine a fitness metric between each predicted frequency response and the measured frequency response.

29. The computer program product of claim 28, further comprising computer usable program code configured to determine a residue of a least square fit for the measured frequency response and each predicted frequency response, wherein the fitness metric is inversely proportional to the residue of the least square fit.

30. The computer program product of claim 27, further comprising computer usable program code configured to select a best fit metric corresponding to a lowest residue of the least square fit determination between the measured frequency response and each predicted frequency response, wherein the estimated device location corresponds to the possible device location with the best fit metric.

31. A vehicle, comprising:
  a device for radio navigation, wherein the device for radio navigation includes:
    means for predicting a frequency response for each of a multiplicity of possible vehicle locations, wherein the means for predicting a frequency response comprises:
      means for determining a location of any objects proximate to the device;
      means for determining physical dimensions of any objects proximate to the and
      means for determining electromagnetic properties of any objects proximate to the device;
    means for measuring a frequency response at an actual vehicle location; and
    means for matching the measured frequency response to one of the predicted frequency responses to determine an estimated vehicle location, wherein the estimated vehicle location corresponds to the possible vehicle location associated with the one predicted frequency response that most closely matches the measured frequency response, wherein each predicted frequency response for each of the multiplicity of possible device locations and the measured frequency response at the actual device location are representable by a plot of received power over a selected range of frequencies to match the measured frequency response to one of the predicted frequency responses.

32. The vehicle of claim 31, further comprising means for determining scattering or multipath interference caused by any objects proximate to the vehicle.

33. The vehicle of claim 31, further comprising means for determining a fitness metric between each predicted frequency response and the measured frequency response.

* * * * *